United States Patent
McMillian

(10) Patent No.: US 10,539,809 B2
(45) Date of Patent: Jan. 21, 2020

(54) INTERCHANGEABLE EYEGLASS TEMPLE DEVICE

(71) Applicant: Ross McMillian, Redford, MI (US)

(72) Inventor: Ross McMillian, Redford, MI (US)

( * ) Notice: Subject to any disclaimer, the term of this patent is extended or adjusted under 35 U.S.C. 154(b) by 142 days.

(21) Appl. No.: 15/729,357

(22) Filed: Oct. 10, 2017

(65) Prior Publication Data

US 2019/0107733 A1  Apr. 11, 2019

(51) Int. Cl.
  *G02C 5/14*  (2006.01)

(52) U.S. Cl.
  CPC ......... *G02C 5/146* (2013.01); *G02C 2200/06* (2013.01); *G02C 2200/08* (2013.01)

(58) Field of Classification Search
  None
  See application file for complete search history.

(56) References Cited

U.S. PATENT DOCUMENTS

| | | | |
|---|---|---|---|
| 2,547,923 A | 4/1951 | Brown | |
| 5,185,620 A | 2/1993 | Cooper | |
| D386,511 S | 11/1997 | Takekoshi | |
| 6,585,370 B2 | 7/2003 | Zelman | |
| 8,317,318 B2 | 11/2012 | Silver | |
| 8,608,309 B2 | 12/2013 | Schnoll et al. | |
| 9,081,213 B2 | 7/2015 | Weinberg | |
| 2009/0296042 A1 | 12/2009 | Yeh | |
| 2014/0125939 A1 | 5/2014 | Ho | |
| 2015/0042948 A1 | 2/2015 | Chung | |
| 2016/0209676 A1* | 7/2016 | Chen | G02C 5/146 |

* cited by examiner

Primary Examiner — Ricky L Mack
Assistant Examiner — Gary W O'Neill

(57) ABSTRACT

An interchangeable eyeglass temple device removably secures a temple to an eyeglass frame. The device includes eyeglasses having a frame. A receiver extends from the frame. A connection arm extends from a temple. The connection arm is insertable into the receiver. A locking mechanism is coupled to the temple. The locking mechanism includes a locking arm engaging the receiver such that the locking mechanism inhibits removal of the connection arm from the receiver.

13 Claims, 5 Drawing Sheets

INTERCHANGEABLE EYEGLASS TEMPLE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to eyeglass temple devices and more particularly pertains to a new eyeglass temple device for removably securing a temple to an eyeglass frame.

BRIEF SUMMARY OF THE INVENTION

An embodiment of the disclosure meets the needs presented above by generally comprising eyeglasses having a frame. A receiver extends from the frame. A connection arm extends from a temple. The connection arm is insertable into the receiver. A locking mechanism is coupled to the temple. The locking mechanism includes a locking arm engaging the receiver such that the locking mechanism inhibits removal of the connection arm from the receiver.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
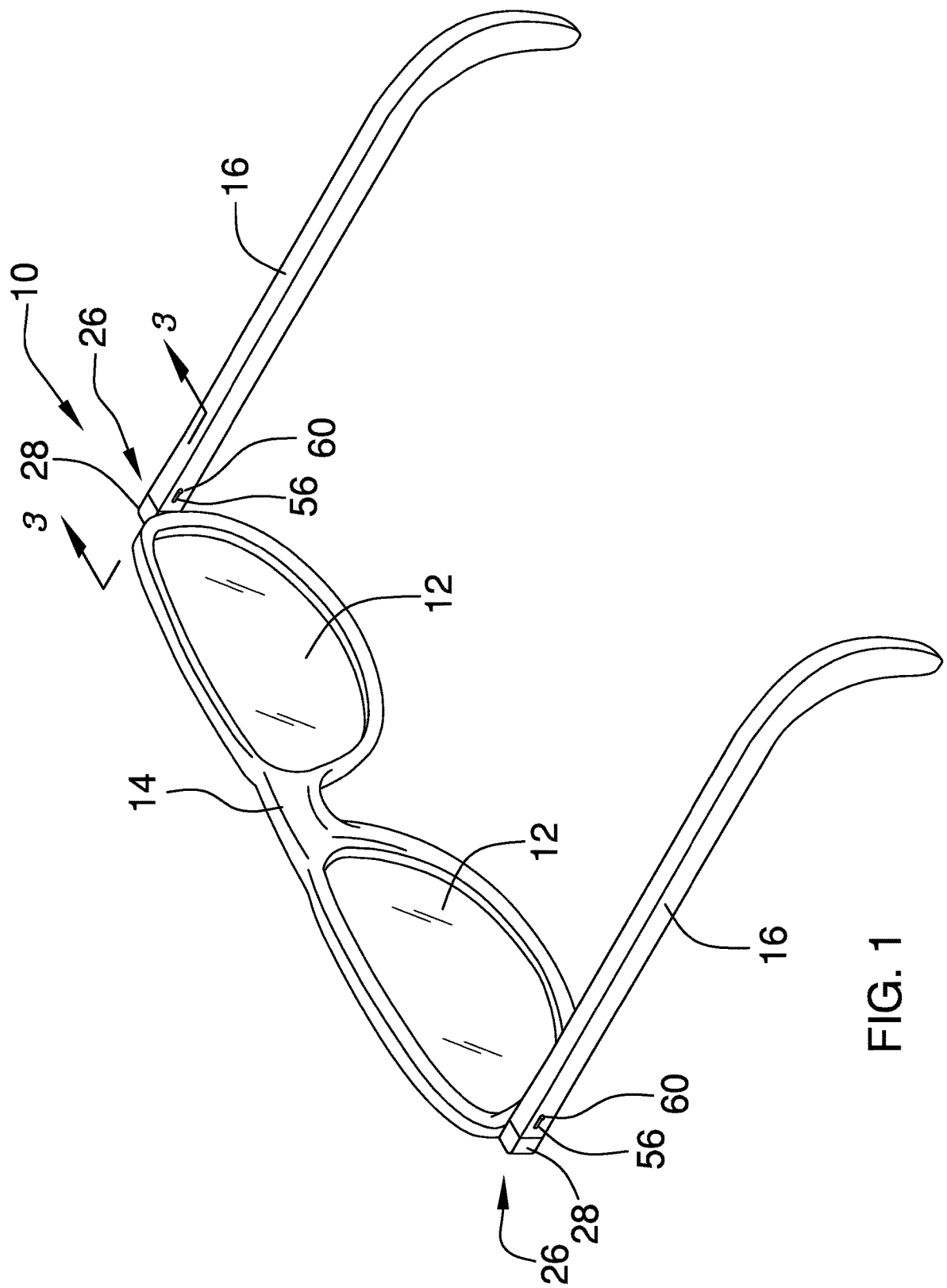
FIG. 1 is a top rear side perspective view of a interchangeable eyeglass temple device according to an embodiment of the disclosure.
Figure 2:
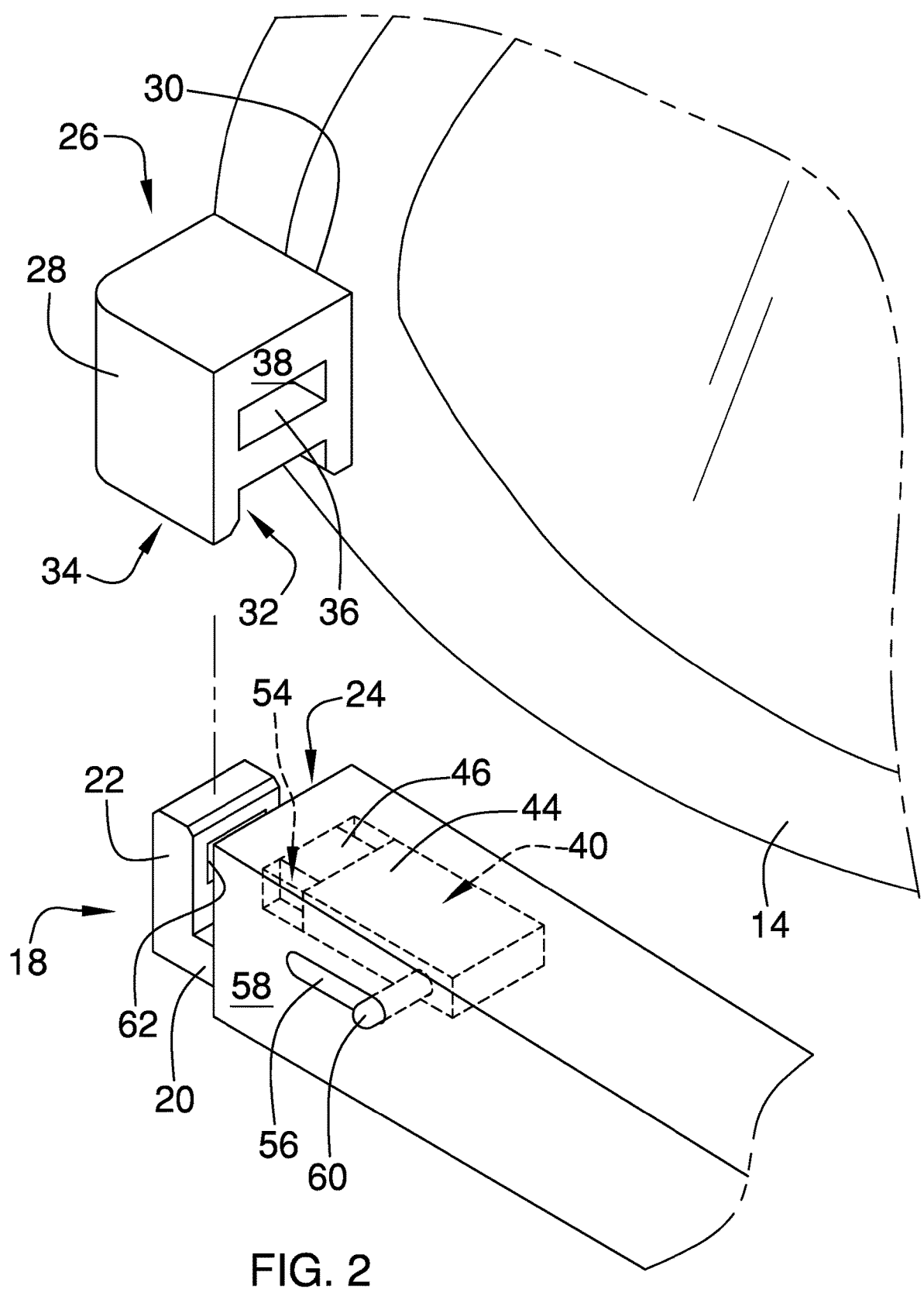
FIG. 2 is a detailed exploded top rear side perspective view of an embodiment of the disclosure.
Figure 3:
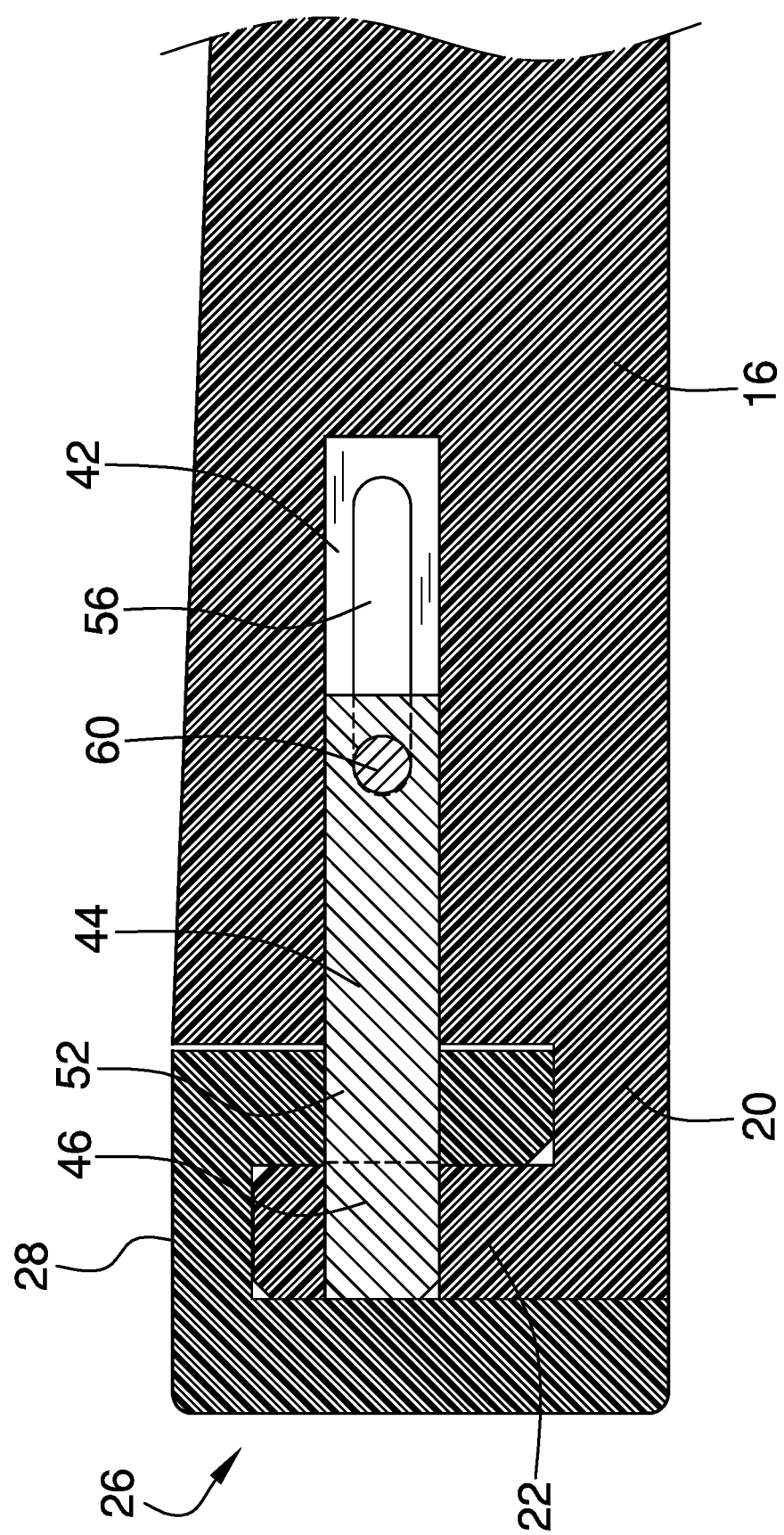
FIG. 3 is a cross-sectional view of an embodiment of the disclosure taken along line 3-3 of FIG. 1.
Figure 4:
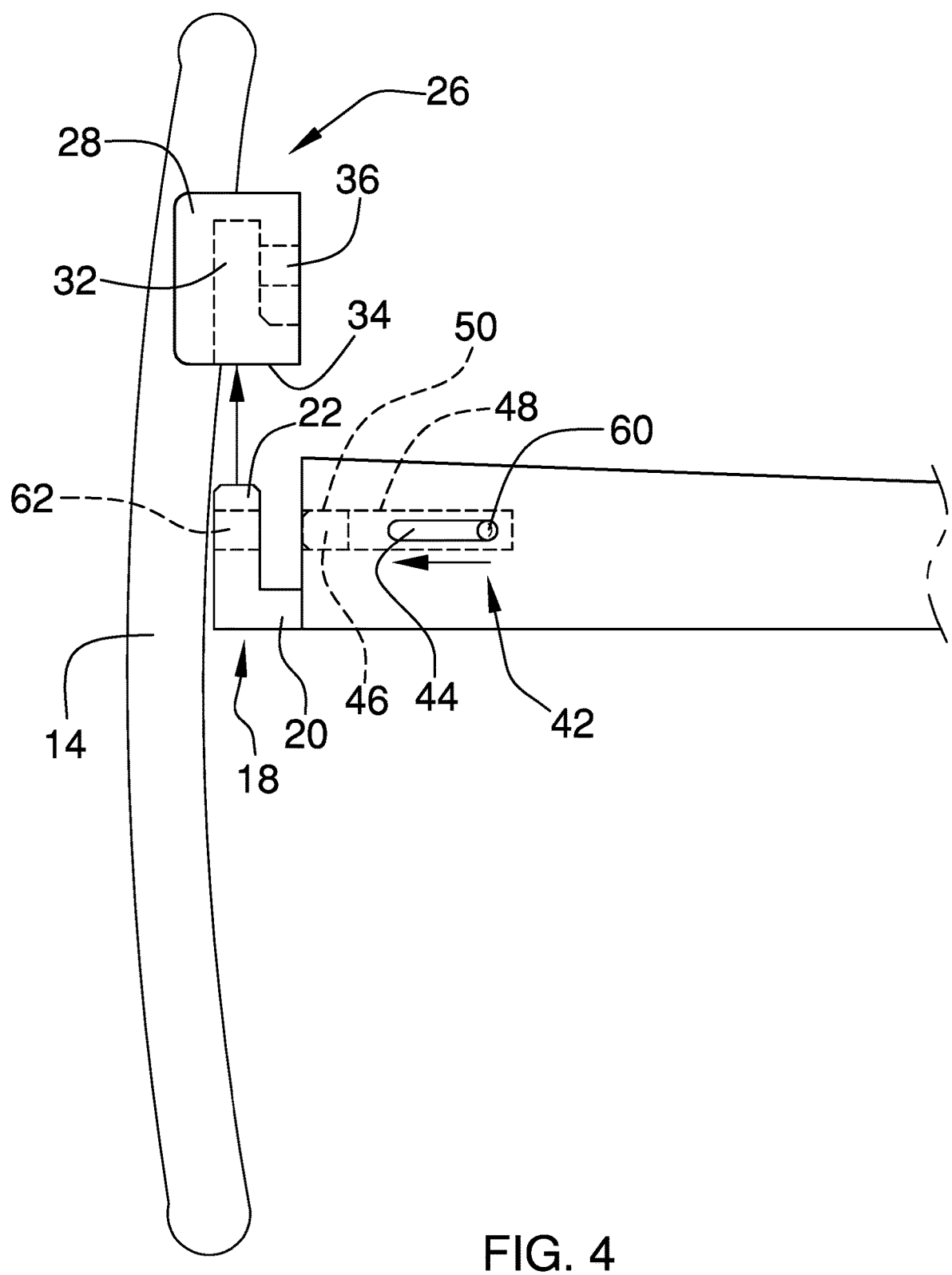
FIG. 4 is a side view of an embodiment of the disclosure.
Figure 5:
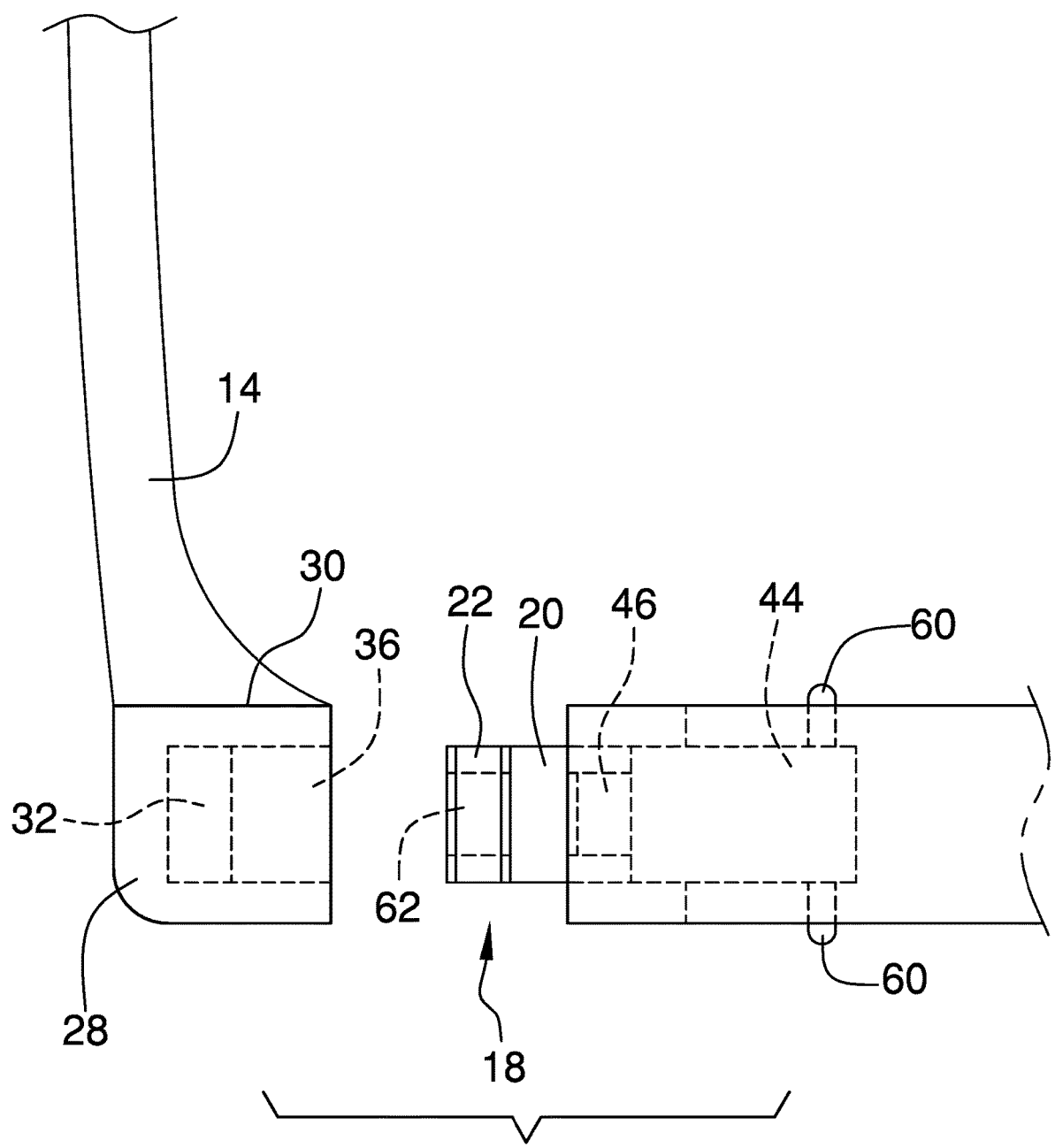
FIG. 5 is a top view of an embodiment of the disclosure.

With reference now to the drawings, and in particular to FIGS. 1 through 5 thereof, a new eyeglass temple device embodying the principles and concepts of an embodiment of the disclosure and generally designated by the reference numeral 10 will be described.

As best illustrated in FIGS. 1 through 5, the interchangeable eyeglass temple device 10 generally comprises eyeglasses 12 having a frame 14. A temple 16 has a connection arm 18 coupled to and extending from the temple 16. The connection arm 18 has a proximal section 20 extending from the temple 16 and a distal section 22 extending from the proximal section 20 at an angle relative to the proximal section 20. The angle may be a right angle wherein the connection arm 18 is L-shaped. The proximal section 20 extends outwardly from a forward surface 24 of the temple 16. A receiver 26 is coupled to and extends from the frame 14. The connection arm 18 is insertable into the receiver 26. The receiver 26 includes a body 28 having a lateral surface 30 coupled to the frame 14 such that the receiver 26 extends laterally from the frame 14. A connection slot 32 extends into a bottom 34 of the body 28. The connection slot 32 is complementary in shape to the connection arm 18. A receiver locking slot 36 extends into a face 38 of the body 28 perpendicular to the connection slot 32 wherein insertion of a locking arm 40 into the receiver locking slot 36 inhibits removal of the connection arm 18 from the connection slot 32.

A locking mechanism 42 is coupled to the temple 16. The locking mechanism 42 includes the locking arm 40 for engaging the receiver 26 such that the locking mechanism 42 inhibits removal of the connection arm 18 from the receiver 26. The locking arm 40 has a main section 44 and an extended section 46. The extended section 46 has a width less than a width of the main section 44. The extended section 46 may also be centrally positioned relative to the width of the main section 44. A top surface 48 of the main section 44 is coplanar with a top surface 50 of the extended section 46. A portion 52 of the main section 44 occupies the receiver locking slot 36 when the locking arm 40 is fully extended from the temple 16. The portion 52 of the main section 44 has a cross-sectional shape complementary to a shape of the receiver locking slot 36. A socket 54 extends into the temple 16. The locking arm 40 is positioned in and extendable from the socket 54. A channel 56 extends through a lateral face 58 of the temple 16. The channel 56 is aligned with the socket 54. A pin 60 is coupled to the locking arm

40. The pin 60 extends from the locking arm 40 and extends outwardly from the locking arm 40 through the channel 56 such that sliding the pin 60 in the channel 56 extends the locking arm 40 from the socket 54 outwardly from the temple 16 to occupy the receiver locking slot 36 when the connection arm 18 is positioned in the connection slot 32.

An arm locking slot 62 extends through the connection arm 18. The arm locking slot 62 is aligned with the receiver locking slot 36 when the connection arm 18 is positioned fully within the connection slot 32. The locking arm 40 extends through the receiver locking slot 36 and into the arm locking slot 62 when fully extended from the temple 16. The extended section 46 is complementary in shape to the arm locking slot 62. The extended section 46 is positioned within the arm locking slot 62 when the locking arm 40 is fully extended from the temple 16.

In use, the temple 16 as described may be one of many interchangeable temples 16 having the described structure for interchangeable connection to the frame 14. The pin 60 is positioned in the channel 56 to retract the locking arm 40 fully. The connection arm 18 is then positioned in the connection slot 32. The pin 60 is then moved in the channel 56 to extend the locking arm 40 which extends through the receiver locking slot 36 and the arm locking slot 62. Thus, the connection arm 18 is secured in the connection slot 32. While not shown, the receiver 26 may be pivotally coupled to the frame 14 such that the temple 16, while connected to the receiver 26, may be pivoted relative to the frame 14 in a conventional manner. Temples 16 may be interchanged freely as desired for each side of the frame 14 for purposes of repair or simply to change the overall appearance.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An interchangeable eyeglass temple device comprising:
    eyeglasses having a frame;
    a receiver coupled to and extending from said frame;
    a temple, said temple having a connection arm coupled to and extending from said temple, said connection arm being insertable into said receiver;
    a socket extending into said temple parallel to a longitudinal axis of said temple; and
    a locking mechanism coupled to said temple, said locking mechanism including a locking arm engaging said receiver such that said locking mechanism inhibits removal of said connection arm from said receiver, said locking arm being positioned in and extendable from said socket parallel to the longitudinal axis of said temple.

2. The device of claim 1, wherein said receiver further comprises:
    a body having a lateral surface coupled to said frame such that said receiver extends laterally from said frame;
    a connection slot extending into a bottom of said body, said connection slot being complementary in shape to said connection arm; and
    a receiver locking slot extending into a face of said body perpendicular to said connection slot wherein insertion of said locking arm into said receiver locking slot inhibits removal of said connection arm from said connection slot.

3. The device of claim 2, further comprising an arm locking slot extending through said connection arm, said arm locking slot being aligned with said receiver locking slot when said connection arm is positioned fully within said connection slot, said locking arm extending through said receiver locking slot and into said arm locking slot when fully extended from said temple.

4. The device of claim 3, further comprising:
    said locking arm having a main section and an extended section, said extended section having a width less than said main section; and
    said extended section being complementary to said arm locking slot, said extended section being positioned within said arm locking slot when said locking arm is fully extended from said temple.

5. The device of claim 2, further comprising:
    said locking arm having a main section and an extended section, said extended section having a width less than said main section; and
    said portion of said main section having a cross-sectional shape complementary to a shape of said receiver locking slot.

6. The device of claim 1, further comprising said connection arm having a proximal section extending from said temple and a distal section extending from said proximal section at an angle relative to said proximal section.

7. The device of claim 6, further comprising said angle being a right angle wherein said connection arm is L-shaped.

8. The device of claim 6, further comprising said proximal section extending outwardly from a forward surface of said temple.

9. The device of claim 1, further comprising:
    a channel extending through a lateral face of said temple, said channel being aligned with said socket; and
    said locking mechanism including a pin coupled to said locking arm, said pin extending from said locking arm and extending outwardly from said locking arm through said channel such that sliding said pin in said channel extends said locking arm from said socket outwardly from said temple to occupy said receiver locking slot when said connection arm is positioned in said connection slot.

10. The device of claim 1, further comprising said locking arm having a main section and an extended section, said extended section having a width less than said main section.

11. The device of claim 10, further comprising a top surface of said main section being coplanar with a top surface of said extended section.

12. The device of claim 10, further comprising a portion of said main section occupying said receiver locking slot when said locking arm is fully extended from said temple.

13. An interchangeable eyeglass temple device comprising:
- eyeglasses having a frame;
- a temple, said temple having a connection arm coupled to and extending from said temple, said connection arm having a proximal section extending from said temple and a distal section extending from said proximal section at an angle relative to said proximal section, said angle being a right angle wherein said connection arm is L-shaped, said proximal section extending outwardly from a forward surface of said temple,
- a receiver coupled to and extending from said frame, said connection arm being insertable into said receiver, said receiver comprising
  - a body having a lateral surface coupled to said frame such that said receiver extends laterally from said frame,
  - a connection slot extending into a bottom of said body, said connection slot being complementary in shape to said connection arm, and
  - a receiver locking slot extending into a face of said body perpendicular to said connection slot;
- a locking mechanism coupled to said temple, said locking mechanism comprising
  - a locking arm engaging said receiver such that said locking mechanism inhibits removal of said connection arm from said receiver by insertion of said locking arm into said receiver locking slot to inhibit removal of said connection arm from said connection slot, said locking arm having a main section and an extended section, said extended section having a width less than said main section, a top surface of said main section being coplanar with a top surface of said extended section, a portion of said main section occupying said receiver locking slot when said locking arm is fully extended from said temple, said portion of said main section having a cross-sectional shape complementary to a shape of said receiver locking slot,
  - a socket extending into said temple parallel to a longitudinal axis of said temple, said locking arm being positioned in and extendable from said socket parallel to the longitudinal axis of said temple,
  - a channel extending through a lateral face of said temple, said channel being aligned with said socket,
  - a pin coupled to said locking arm, said pin extending from said locking arm and extending outwardly from said locking arm through said channel such that sliding said pin in said channel extends said locking arm from said socket outwardly from said temple to occupy said receiver locking slot when said connection arm is positioned in said connection slot; and
- an arm locking slot extending through said connection arm, said arm locking slot being aligned with said receiver locking slot when said connection arm is positioned fully within said connection slot, said locking arm extending through said receiver locking slot and into said arm locking slot when fully extended from said temple, said extended section being complementary to said arm locking slot, said extended section being positioned within said arm locking slot when said locking arm is fully extended from said temple.

* * * * *